US007958161B2

(12) United States Patent
Bezeau et al.

(10) Patent No.: US 7,958,161 B2
(45) Date of Patent: Jun. 7, 2011

(54) METHODS AND APPARATUSES FOR PROVIDING HOSTED TAILORED VERTICAL APPLICATIONS

(75) Inventors: Jonathan R Bezeau, Waterloo (CA); Asanka Jayasuriya, Toronto (CA); Nicholas R Manson, Kitchener (CA)

(73) Assignee: Siebel Systems, Inc., San Mateo, CA (US)

(*) Notice: Subject to any disclaimer, the term of this patent is extended or adjusted under 35 U.S.C. 154(b) by 930 days.

(21) Appl. No.: 11/001,358

(22) Filed: Nov. 30, 2004

(65) Prior Publication Data
US 2006/0117065 A1 Jun. 1, 2006

(51) Int. Cl.
*G06F 17/30* (2006.01)
(52) U.S. Cl. ........ 707/803; 707/694; 707/781; 707/791; 707/802; 707/822; 707/828; 717/113; 717/105; 717/132; 706/45; 706/59; 705/10
(58) Field of Classification Search .......... 707/694, 707/781, 791, 802, 822, 828, 999.101, 999.102, 707/999.103, 999.107, 100; 717/113, 105, 717/132; 706/45, 59; 705/10
See application file for complete search history.

(56) References Cited

U.S. PATENT DOCUMENTS

| | | | | |
|---|---|---|---|---|
| 5,842,193 | A * | 11/1998 | Reilly | 706/45 |
| 5,963,910 | A | 10/1999 | Ulwick | 707/7 |
| 6,249,769 | B1 | 6/2001 | Ruffin et al. | 707/7 |
| 6,311,144 | B1 | 10/2001 | Abu El Ata | 703/2 |
| 6,411,936 | B1 | 6/2002 | Sanders | 705/10 |
| 6,502,193 | B1 | 12/2002 | Barber | 726/4 |
| 6,513,111 | B2 | 1/2003 | Klimczak et al. | 713/1 |
| 6,523,027 | B1 * | 2/2003 | Underwood | 707/4 |
| 6,970,927 | B1 | 11/2005 | Stewart et al. | 709/225 |
| 7,035,825 | B1 | 4/2006 | Sturtevant et al. | 705/51 |
| 7,107,285 | B2 | 9/2006 | Von Kaenel et al. | 707/3 |
| 7,321,894 | B2 | 1/2008 | Degtyar et al. | 707/101 |
| 2002/0059283 | A1 * | 5/2002 | Shapiro et al. | 707/100 |
| 2002/0107864 | A1 * | 8/2002 | Battas et al. | 707/101 |
| 2002/0140731 | A1 * | 10/2002 | Subramaniam et al. | 345/762 |
| 2003/0046661 | A1 | 3/2003 | Farber et al. | 717/7 |
| 2003/0069780 | A1 * | 4/2003 | Hailwood et al. | 705/10 |
| 2004/0093397 | A1 | 5/2004 | Chiroglazov et al. | 709/219 |
| 2004/0117358 | A1 | 6/2004 | Von Kaenel et al. | 707/3 |
| 2004/0133587 | A1 | 7/2004 | Matsumoto et al. | 707/102 |
| 2004/0133876 | A1 | 7/2004 | Sproule | 717/105 |
| 2004/0143470 | A1 | 7/2004 | Myrick et al. | 707/7 |
| 2004/0143749 | A1 | 7/2004 | Tajalli et al. | 713/200 |
| 2004/0162906 | A1 | 8/2004 | Griffin et al. | 709/229 |

(Continued)

OTHER PUBLICATIONS

Gao, Zhuomin, "Conflict Handling in Policy-Based Security Management," University of Florida, 2002, pp. 1-52.

(Continued)

*Primary Examiner* — Syling Yen
(74) *Attorney, Agent, or Firm* — Campbell Stephenson LLP (57) ABSTRACT

Embodiments of the invention provide methods and apparatuses for providing hosted highly tailored vertical applications. In accordance with one embodiment, a set of universal configuration options for a customer relationship management application is created and presented to a user. The user selects one or more options from the set of options provided and the selected options are used to automatically configure a tailored customer relationship management application. For one embodiment of the invention multiple incompatible business entities and processes from existing verticals are decomposed to provide a set of configurations options to a customer company. The customer company selects from the provided configuration options and a highly tailored vertical is automatically configured based upon the selected configuration options.

24 Claims, 5 Drawing Sheets

U.S. PATENT DOCUMENTS

| | | | |
|---|---|---|---|
| 2005/0076330 A1* | 4/2005 | Almgren et al. | 717/113 |
| 2005/0108578 A1 | 5/2005 | Tajalli et al. | 713/201 |
| 2005/0289524 A1 | 12/2005 | McGinnes | 717/140 |
| 2006/0167942 A1 | 7/2006 | Lucas et al. | 707/104.1 |
| 2007/0067373 A1* | 3/2007 | Higgins et al. | 707/206 |
| 2007/0208576 A1 | 9/2007 | Lee et al. | 705/1 |
| 2007/0226241 A1 | 9/2007 | Ng et al. | 707/102 |
| 2007/0239467 A1 | 10/2007 | Bezeau et al. | 705/1 |

OTHER PUBLICATIONS www.wikipedia.ort., "Serialization," Nov. 27, 2003.

* cited by examiner

METHODS AND APPARATUSES FOR PROVIDING HOSTED TAILORED VERTICAL APPLICATIONS

FIELD

Embodiments of the invention relate generally to the field of tailored enterprise software applications, and more specifically to methods for providing hosted tailored vertical software applications.

BACKGROUND

Hosted software applications refer to applications that are stored remotely and accessed over an internet. A hosted application is typically stored on a server of a hosting company and downloaded to a local computer of a customer company when used. Hosted software applications allow a customer company to delegate the responsibilities of maintaining the software application.

One type of software application that may be hosted is a customer relationship management (CRM) application. However, typical CRM applications pose several obstacles to cost-efficient hosting.

A CRM application is an enterprise-wide application that allows companies to manage aspects of customer relationships. A typical CRM application provides a set of business objects (entities) and a set of business processes (processes) that operate on the entities. Entities represent a distinct matter of importance to a business. Entities may include, for example, contacts, accounts, or the relationship between them. Processes operate on and across one or more of the entities and define possible states and transitions of the entities. Processes may include, for example, an account setup process for opening a new account.

Typically, CRM application includes a suite of sales and service functionality referred to as base CRM functionality (base CRM). The base CRM applications can be specialized or tailored to address the needs of a specific industry. Such industry-specific CRM applications are referred to as vertical CRM applications (verticals). Moreover, a base CRM application or a vertical may be tailored to address the needs of the particular customer company using the application. Such highly tailored applications require additional computational or storage resources for the application to manage additional information regarding company-specific entities and processes.

In a conventional, non-hosted, environment, the CRM application is installed at a location specific to the customer company and these additional costs can be attributed to the customer-company.

A customer-specific CRM application may employ components of one or more verticals. For example, a CRM application specifically tailored for a large automotive dealer may include components of an automotive vertical for processing automotive accounts and services as well as components of a financial vertical for managing loans. For such, highly tailored CRM applications, employing components from multiple verticals, difficulties arise in maintaining consistency of shared data across verticals. For example, for a tailored CRM application employing components of an automotive vertical and a financial vertical, vehicles and loans may each be considered products and changes to either entity may affect both.

Again, for non-hosted CRM applications the associated cost of maintaining consistency of shared data is borne by the particular customer company. The tailoring is effected only if the functionality is sufficiently valuable to the particular customer company.

As noted above, hosting CRM applications provides a number of advantages for a customer company. Such advantages are even greater when the hosted CRM application is a highly tailored vertical application. A hosting company that provides highly tailored vertical applications is likely to be of greater interest to potential customer companies than a hosting company that provides only a base CRM functionality.

However, the characteristics of highly tailored verticals discussed above make hosting such applications problematic for the hosting company. Hosting companies rely on economy of scale provided by efficiently sharing resources with multiple customer companies. Highly tailored CRM vertical applications may be customer-specific or at most applicable to a small number of customer companies. Hosting multiple individual highly tailored verticals is incompatible with the economies of scale necessary to make hosting a financially attractive endeavor. That is, currently, to provide a highly tailored vertical to multiple customer companies requires multiple software systems and servers.

Moreover, the inability to differentiate customer companies based upon their respective resource usage in order to provide accurate cost assessment (billing), is an additional problematic area in hosting highly tailored verticals. That is, a practical implementation for hosting highly tailored verticals should allow for differentiated cost assessment proportional to resource usage that is unavailable with current hosting schemes.

SUMMARY

Embodiments of the invention provide methods and apparatuses for providing hosted highly tailored vertical applications. In accordance with one embodiment, a set of universal configuration options for a customer relationship management application is created and presented to a user. The user selects one or more options from the set of options provided and the selected options are used to automatically configure a tailored customer relationship management application.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide a highly tailored vertical while addressing the difficulties of hosting such an application. Embodiments of the invention provide a set of universal configuration options (UCOs). The UCOs can be used to produce a highly tailored vertical through use of operational and runtime tailoring capabilities. For one embodiment of the invention management capabilities for the UCOs are distributed in a manner that allows differential assessment of costs based upon resource usage.

For one embodiment of the invention incompatible business entities and processes from multiple existing verticals are decomposed to provide a set of UCOs. The deep functionality of each vertical CRM remains and is isolated behind corresponding configuration settings.

One embodiment of the invention provides a base CRM application and a set of UCOs that allow each of multiple customer companies to specify a highly tailored vertical by providing a company-specific configuration. For one embodiment of the invention a highly tailored vertical is automatically configured upon receipt of the configuration information from the customer company.

Therefore, in contrast to prior art schemes in which multiple instances of a software system are deployed and each is individually modified to effect particular verticals, embodiments of the invention allow a single hosted software system having a set of UCOs which allow each customer company to specify a highly tailored vertical.

Additionally, or alternatively, embodiments of the invention may provide a system for granting privileges in a secure and traceable manner to individual companies and users to effect a differential cost assessment scheme based on resource usage.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

System

Figure 1:
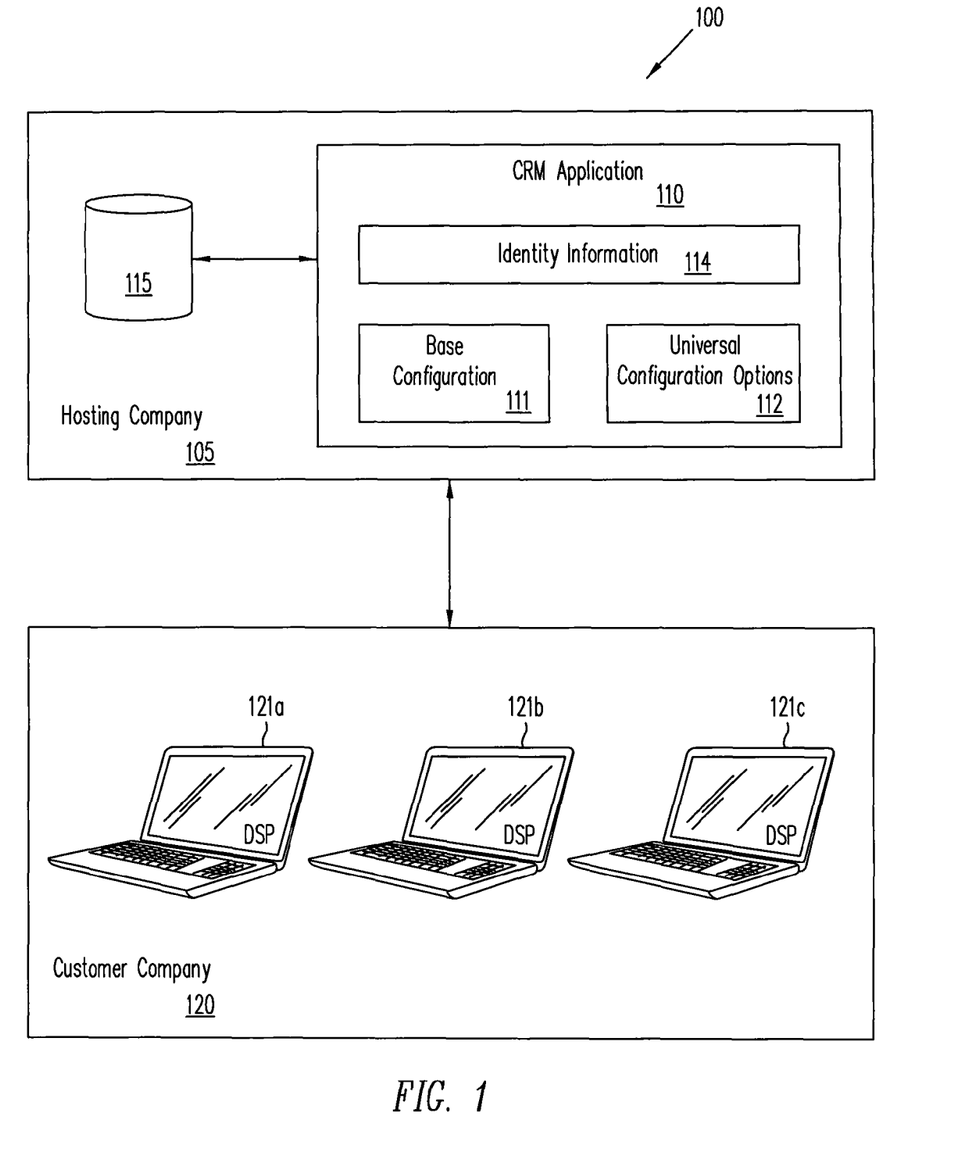
FIG. 1 illustrates a system for implementing a hosted CRM application having a set of universal configuration options for specifying a highly tailored vertical in accordance with one embodiment of the invention.

FIG. 1 illustrates a system for implementing a hosted CRM application having a set of UCOs for specifying a highly tailored vertical in accordance with one embodiment of the invention. System 100, shown in FIG. 1 includes a hosting company 105. Hosting company 105 provides a CRM application 110. The CRM application 110 may be run on one or multiple servers not specifically shown. The servers may be a number of individual digital processing systems (DPSs) connected through a communication link such as a local area network (LAN), an intranet, or the like. Moreover, the CRM application may be implemented as a single software program or multiple software programs cooperating with one another.

The CRM application 110 includes a base CRM configuration 111 and a set of UCOs 112. For an alternative embodiment the CRM application does not include a base configuration, but only a set of UCOs 112.

Hosting company 105 is communicatively coupled to one or more customer companies shown for example as customer company 120. In one embodiment of the invention, the CRM application 110 concurrently serves multiple customer companies. The hosting company 105 may be connected to the customer companies through a communication link which may be a network communications or any medium through which different devices may communicate such as the Internet, a wide area network (WAN), a local area network (LAN), an intranet, or the like. Customer company 120 includes a number of DPSs, shown for example as 121a-121c, through which users at the customer company 120 may access the CRM application 110 to configure and use a highly tailored vertical. The users at the customer company select one or more UCOs from the set of UCOs 112 to modify the base CRM configuration. The UCOs selected may be based on the specific business needs associated with the particular customer company, the role of the user within the customer company, or the individual user. The CRM application stores identity information 114 regarding the customer companies, the roles within each customer company, and the individual users at each customer company.

For one embodiment of the invention the UCOs used to tailor the vertical may be specified by one of three classes of users: customer service representatives (CSRs), customer company administrators (CCAs) and customer company employees (CCEs).

CSRs are employed by the hosting company and may operate across several customer companies. CSRs place tailoring requests against the CRM application in order to provide provisioned access to the customer companies and their employees based upon the services requested (e.g., purchased) by the customer company.

CCAs are employed by the customer company and may also place tailoring requests against the CRM application to manage employees of the customer company.

CCEs may also place tailoring requests, though such requests are typically limited. CCEs primarily place operational requests against the CRM application to display or transition business entity states. In contrast, CSRs and CCAs typically do not place operational requests.

In accordance with one embodiment of the invention tailoring capabilities are provided to the users at runtime (i.e., during the regular operation of the CRM application). For one embodiment of the invention, data store 115 is used to store identity information and selected UCOs associated with a particular user in a runtime configuration database. A serialized association of granted privileges for each user, as discussed below in reference to provisioned access control, may also be stored in data store 115.

Universal Business Entities and Processes

In accordance with one embodiment of the invention multiple existing business entities and process are decomposed into a set of universal business entities and processes. Decomposition allows existing business entities and processes to be integrated into a UCO set. Decomposition allows two or more incompatible CRM applications such as, for example, a base CRM application and a particular vertical to be essentially combined into a highly tailored vertical that is more amenable to hosting.

Typically, CRM applications include several entities and several processes. Entities are typically databases containing some pertinent data. Processes operate on one or more entities and modify the state of the entities or produce additional entities through the operation.

For example, a base CRM application may include entities such as leads, accounts, and contacts for the accounts, and may include a setup process for a new account that identifies a contact for the account. In contrast, a vertical, for example a medical education vertical may include entities such as hospitals and doctors. The hospital entity may specialize an account; thus, setting up a hospital sets up an account with additional information. That is, the entities may differ and substantially similar entities may have differing attributes. For example, for a medical education vertical each contact may include the attribute accreditations whereas in a base CRM application such an attribute, which is not typically required, would not be included.

Therefore a process that defines a contact in a medical education vertical would require different or additional information than a corresponding process of a base CRM application or a different vertical.

In general, an entity of one CRM application cannot be processed in the same manner as a substantially corresponding entity of a base CRM application or a different vertical.

For example, a base CRM application typically has functionality that is account-centric. The account may include shipping and billing addresses as well as a primary contact. The business efforts are focused toward the primary contact for the account. If an account is terminated, it is likely that the associated contacts are removed along with the account. Account and primary contact are highly related entities and are considered to be tightly bound. A medical education vertical functionality however, is contact-centric. The primary contact for an account, which is a hospital, may be the hospital administrator, but his may not be the person, or the only person, toward whom the business efforts are focused. Business efforts will be focused toward healthcare personnel at the hospital.

The two applications are incompatible and can't be used in conjunction without risking producing incompatible data or losing data. For example, if the entity hospital is processed in the same manner as an account of a base CRM application, valuable contact information may be discarded if the account is terminated.

To address these conflicts in the entities and processes of incompatible CRM applications, an embodiment of the invention creates universal business entities and processes by decomposing the various entities and processes. Configuration is then used to specify the relationship between two or more entities. For example, the entity, hospital, of a medical education vertical is decomposed into that portion that pertains to an account generally, and the remaining portion pertaining specifically to a hospital. Hospital is viewed as a type of account, and that type is divided from the entity such that it can be processed independently. Similarly, the entity doctor is decomposed into general contact information and additional information pertaining to a doctor. Configuration is then used to determine the relationship between the entities (e.g., tightly or loosely bound), and also to specify whether a particular customer company will use these entities.

Entity Conflicts

Embodiments of the invention resolve two types of entity conflict; an overlapping entity conflict and an exclusive entity conflict.

Figure 2:
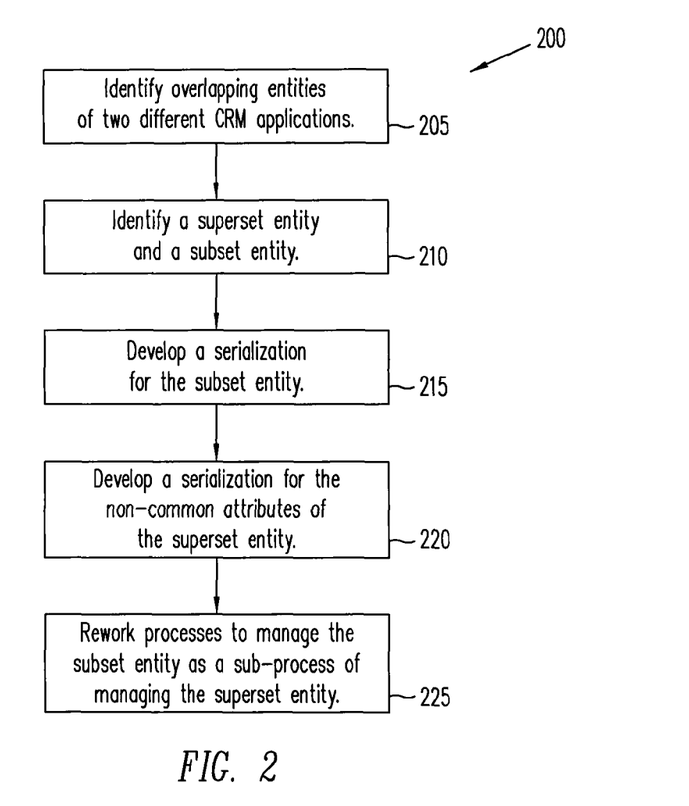
FIG. 2 illustrates a process in which an overlapping entity conflict is resolve in accordance with one embodiment of the invention.

An overlapping entity conflict occurs where an entity of one CRM application is a superset or partial superset of an entity of one or more other CRM applications. FIG. 2 illustrates a process in which an overlapping entity conflict is resolve in accordance with one embodiment of the invention. Process 200 begins at operation 205 in which an entity of one CRM application is identified as overlapping a corresponding entity of one or more other CRM applications. For example, as discussed above, a hospital entity of a medical education vertical may be a superset of an account entity of a base CRM application, because the hospital entity includes all of the information of the account entity as well as additional information. For example, the hospital entity may reference entities such as doctors and nurses, and may specify particular roles within the hospital for these personnel such as specifying that a doctor is a surgeon or that a nurse is a member of the emergency receiving staff. In contrast, an account entity for a typical customer company may simply have employees with a corresponding title.

At operation 210 the entities are identified as superset and subset entities. In general the entities need not have a strict subset/superset relationship, but only a partial such relationship.

Figure 3:
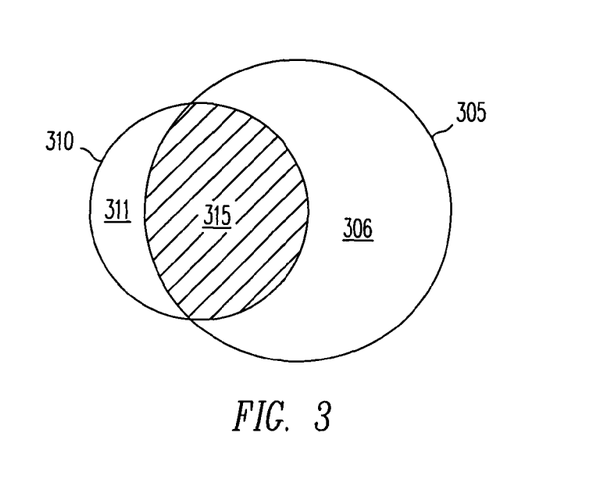
FIG. 3 depicts a partial subset/superset relationship between corresponding entities of different CRM applications in accordance with one embodiment of the invention.

FIG. 3 depicts a partial subset/superset relationship between corresponding entities of different CRM applications in accordance with one embodiment of the invention. As shown in FIG. 3, circular area 305 represents an entity of a first CRM application and circular area 310 represents a corresponding entity of a second CRM application. Shaded area 315 represents common information of the two entities. Crescent area 306 represents non-common information (i.e., extension information of the first entity beyond the common information and crescent area 311 represents the extension information of the second entity beyond the common information. For purposes of this description, the entity having the greater extension information will be described as the superset entity and the entity having the lesser extension information will be described as the subset entity.

Referring again to FIG. 2, at operation 215 a serialization of the subset entity is developed and used for the subset entity. The subset entity is analyzed and the base attributes (entities and processes) are determined for the entity. The base attributes represent that portion of the entity that is common to the superset entity and moreover, is generally universal to all such entities (e.g., to corresponding entities of different CRM applications). This universal portion is extracted to create a central record (e.g., a database record) comprised of the base attributes.

At operation 220 a serialization of the non-common attributes of the superset entity is developed. This serialization will contain a reference to the serialization of the subset entity and is referred to as a referring serialization. For one embodiment of the invention, the referring serialization is implemented as an extension record of a database record containing the serialization of the subset entity. The superset entity may be implemented as two tables within the database. The first table contains all of the data specific to the subset entity. For example if the subset entity is account, the first table may contain a shipping address, a billing address, a primary account, and other entities and processes generally pertaining to such entities.

The second table contains all of the additional data specific to the superset entity. For example, if the superset entity is a hospital, the second table contains hospital-specific entities and processes such as the hospital amenities (e.g., emergency room, 24-hour nursing, etc.), which could not be effectively implemented in a database record for an account. The second table also contains a reference (ID) that refers to the first table and creates a direct relationship to the first table, so that if the superset entity (e.g., hospital) is accessed, the subset entity (e.g., account) information is referenced as well.

At operation 225 the business processes are reworked in order to manage the subset entity as a sub-process of managing the superset entity. The subset entity may have associated processes that are not shared by the superset entity. For example, in setting up a hospital a core of account data is used, but processes applicable to accounts may not be the same. As described above, a base CRM application may consider accounts and contacts as highly related entities and include code that maintains this tight binding. Therefore a billing address change process effected for the account may include changing the address of every contact associated with the account. Such a process is not central to an account, but may be beneficial to a particular customer company. Such a customer company may desire a CRM application that includes the additional billing logic to propagate a change in account billing address to each contact associated with the account. Therefore, the process (e.g., change billing address process) has to be reworked so that there is an optional portion that can be activated if desired. In general the processes are reworked in any instance where the processes applicable to the superset entity are not the same as corresponding processes.

An additional type of entity conflict resolved by one embodiment of the invention is an exclusive entity conflict. An exclusive entity conflict occurs where two entities interpret the same serialization in different ways. That is each of two CRM applications may have the same specific information, but treat that information in a different manner. For one CRM application the information may have an industry-specific meaning not applicable to the other. For example, the entity account may have the attribute "classification". For a base CRM application the attribute "classification" of an account may have a general meaning that may be specific to particular customer companies. However for verticals that implement accounts in a specific way, the attribute "classification" may have a strictly interpreted industry-specific meaning. For example, as applied to the entity "hospital", the attribute "classification" may indicate the services available at the hospital.

Figures 4, 5:
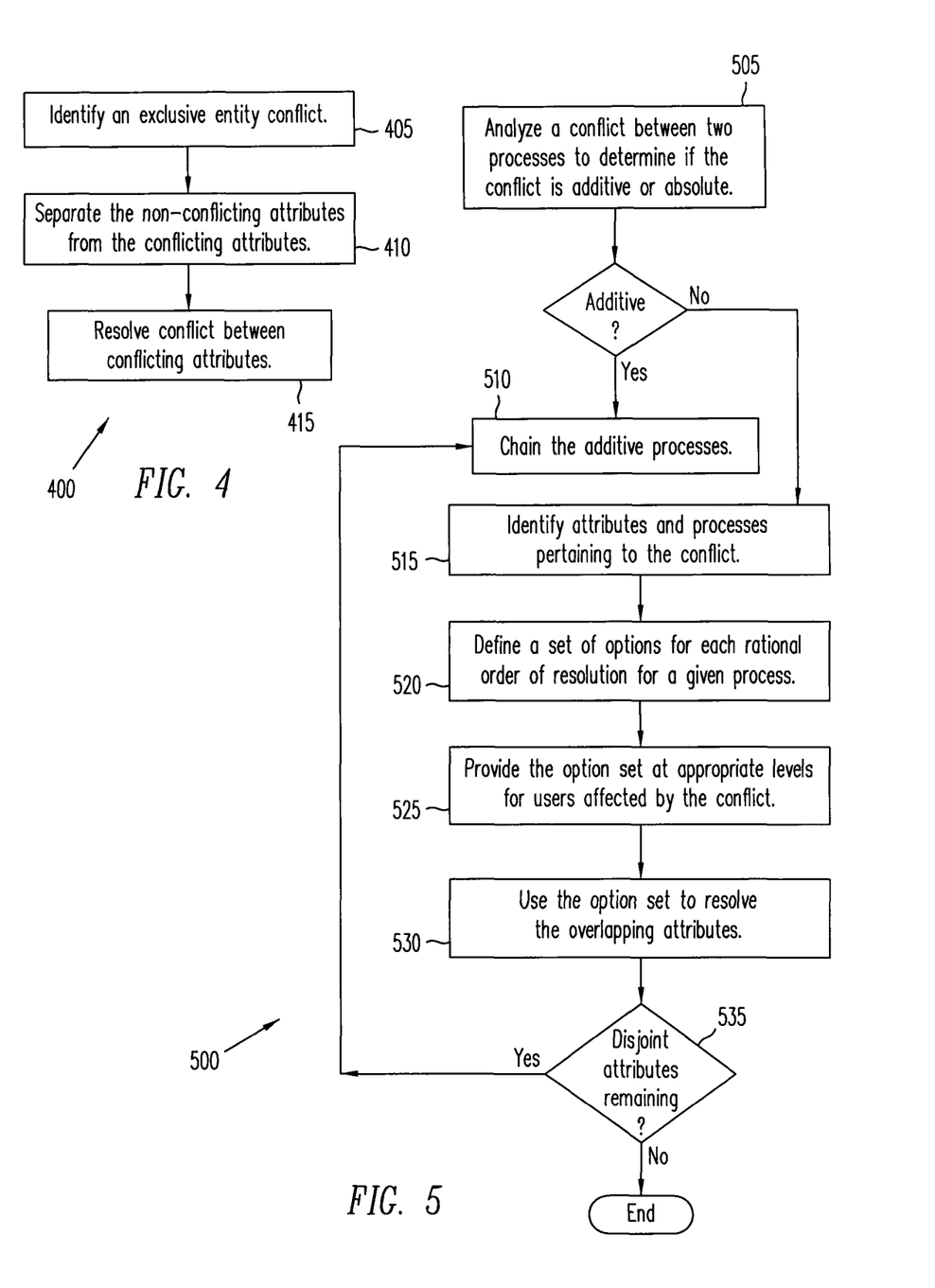
FIG. 4 illustrates a process for resolving an exclusive entity process in accordance with one embodiment of the invention.
FIG. 5 illustrates a process for resolving process conflicts in accordance with one embodiment of the invention.

FIG. 4 illustrates a process for resolving an exclusive entity conflict in accordance with one embodiment of the invention. Process 400, shown in FIG. 4, begins at operation 405 in which an exclusive entity conflict is identified. Exclusive entity conflicts are identified where two entities using the same underlying database row and column derive different meanings from the data.

At operation 410, the non-conflicting common attributes of each entity are separated from the conflicting attributes. For one embodiment of the invention, a third entity is created to contain the non-conflicting attributes. For such an embodiment, the result is three serializations: one core serialization containing the common non-conflicting attributes, and a separate serialization for each CRM application containing the conflicting attributes. So for example, the three serializations may be a core account serialization containing common attributes of an account, a serialization for hospital classifications (for a medical vertical) and a serialization for account classifications (for a base CRM application).

At operation 415 the conflict between the two separate attribute serializations is resolved separately. Because the conflict between the two separate attribute serializations amounts to an overlapping entity conflict, it can be resolved as discussed above in reference to process 200 of FIG. 2 for one embodiment of the invention.

Process Conflicts

Upon resolution of entity conflicts, conflicts between processes are resolved. Determination of process conflicts can be accomplished in various ways and is typically dependent upon analysis of the state of the entity involved in the process. Process conflicts may be additive process conflicts in which two disconnected processes operate on disjoint attribute sets of an entity. Process conflicts may also be absolute process conflicts in which two disconnected processes operate on partially disjoint attribute sets of an entity.

FIG. 5 illustrates a process for resolving process conflicts in accordance with one embodiment of the invention. Process 500, shown in FIG. 5, begins at operation 505 in which a process conflict is analyzed to determine if it is an additive process conflict or an absolute process conflict.

Upon determination that the process conflict is an additive process conflict, the two processes are chained at operation 510. This allows each of the disconnected processes to be optionally implemented during configuration. Since the processes are disconnected, the order in which the processes are chained is irrelevant. For example, consider a billing address change process for an account that includes changing an account billing address as well as the process of correspondingly changing the billing address of any associated contacts. Such a process may be very desirable for some customer companies but not for others. By chaining the disconnected processes, the option of changing the billing address for an account is provided with the further option of having the change in billing address propagated to the associated contacts for the account. Thus greater configuration flexibility is provided over prior art schemes in which a single integrated specialized process option was provided.

Upon determination that the process conflict is an absolute process conflict, the process conflict resolution continues at operation 515-535 as described below.

Resolution of an absolute process conflict begins at operation 515 in which the attributes and sub-processes of each of the conflicting processes that pertain to the conflict are identified. For example, the logic implementing lead-conversion for a CRM application with account-centric functionality, is different than for a CRM application with contact-centric functionality.

At operation 520 a set of options is defined for each rational order of resolution for a given business process. For example, in resolving an account-centric versus contact-centric process conflict, the conflict presented is whether it is account information or contact information that is required to effect a lead-conversion. The set of options defined may be account information required, contact information required, or no requirement (e.g., don't care).

At operation 525 the option set is provided at the appropriate levels for the users affected by the conflict. The option set may be universal, or within a tighter scope. That is, depending upon the business case, it may be appropriate to provide the options at the company level or for certain roles within the company. For example, personnel within an accounting division may convert leads to accounts while personnel within a training division of the same customer company may convert leads to contacts.

At operation 530 the option set is used to resolve the overlapping attributes. The option selected determines the values for the data that is created (i.e., the data required). For example, if entering a billing address is part of an account creation process, then a billing address will be required when an account is saved.

At operation 535 any remaining disjoint attributes are identified and are resolved as additive process conflicts through repetition of operation 510 as discussed above.

Generating Universal Configuration Options

Resolution of the identified entity and process conflicts creates option sets that may be included in a set of UCOs. The set of UCOs is a set of option that can be selected on a per-company or per-user basis to automatically create a highly tailored deep vertical. Though the option settings are universal so that the system can understand them and maintain data integrity, they are presented differently to individual users.

Figure 6:
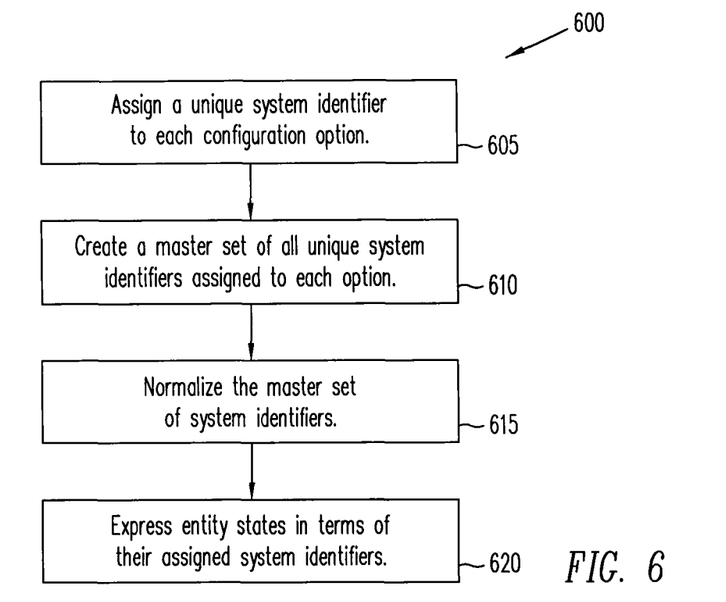
FIG. 6 illustrates a process creating a set of universal configuration options that can be combined to tailor a vertical in accordance with one embodiment of the invention.

FIG. 6 illustrates a process creating a set of UCOs that can be combined to tailor a vertical in accordance with one embodiment of the invention. Process 600, shown in FIG. 6 begins at operation 605 in which each configuration option value is assigned a unique system identifier. This provides the system software the ability to distinguish the options.

At operation 610 a master set is created using the unique system identifiers assigned to each option from all initial sets.

At operation 615 the system identifiers of the master set are normalized so that multiple separate values identifying indistinguishable business entities and processes will be assigned to a common system identifier in the master set. For example, a medical vertical may include the entity medical factory, however for purposes of effecting business processes, the entity medical factory may be indistinguishable from the entity factory. In such cases the two entity values are assigned the same system identifier.

At operation 620 entity states are expressed in terms of their assigned system identifiers instead of the values. This includes references to entity states in business processing. For one embodiment of the invention, the system reliably creates universal system identifiers and forces their existence into one or more CRM applications (e.g., a base CRM application).

Provisioned Access Control

The ability to individually select options to tailor a vertical also provides the basis for differential cost assessment based on resource usage. Embodiments of the invention use provisioned access control to allow cost assessment based on granted privileges. Privileges are identifiable rights within a vertical. Privileges can include basic operations such as updating or deleting a lead or contact or more sophisticated operations such as changing ownership of assets. The set of privileges pertaining to a vertical are based upon the features of the vertical and are dependent upon the configuration options selected.

Figure 7:
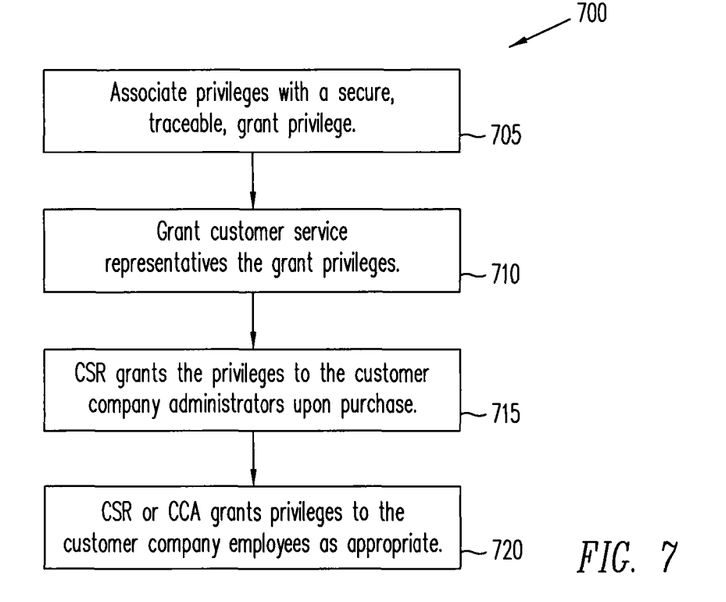
FIG. 7 illustrates a process for implementing provisioned access control in accordance with one embodiment of the invention.

FIG. 7 illustrates a process for implementing provisioned access control in accordance with one embodiment of the invention. Process 700, shown in FIG. 7, begins at operation 705 in which privileges are associated with a corresponding grant privilege. For one embodiment of the invention, those features of a vertical that are amenable to differential cost assessment are associated with privileges that are securely grantable and traceable.

For one embodiment of the invention the privileges are made securely grantable by implementing for each privilege a corresponding grant privilege that controls the ability to grant a privilege. This property may be applied recursively (i.e., implementing a grant privilege for the grant privilege). Additionally, the ability to grant privileges may be restricted based on the class of the user. For example, the ability of CCEs to grant and revoke privileges may be restricted to within the customer company while CSRs are given the ability to grant and revoke privileges across customer companies. For one embodiment of the invention the privileges are made traceable by implementing an internal reporting system that can query the privilege. The internal reporting system also understands the employee, role and company structure of the runtime configuration data store.

At operation 710 the CSRs are given the ability to grant and revoke all securely grantable privileges upon deployment. This ability applies across customer companies. In some instances the CSRs are not granted the privilege themselves, but only the ability to grant the privilege.

At operation 715, upon purchase of a billable service by a customer company, a CSR grants any grantable privileges related to the purchased billable service to one or more CCAs of the customer company. The CRS may also grant the CCAs the ability to grant the related privileges.

At operation 720, privileges related to billable services that can be provisioned to CCEs are granted to the appropriate CCEs. The grant of such privileges to the CCEs may be from the CCAs or from the CSR, directly.

The granted privileges are associated with the particular user and this association is serialized and stored. For one embodiment of the invention that implements a database-based runtime configuration data store, the serialized association of user and privileges is contained in a database table.

Using the provisioned access control method described above, the traceable history of the privilege (both grant and revocation) can be used to effect a differential cost assessment scheme based on the services provided. The customer company may be assessed costs based upon the number and type of privileges granted including the number of CCAs and CCEs granted privileges. Additionally, or alternatively, customer company may be assessed costs based upon the usage of each privilege.

In accordance with one embodiment of the invention the implementation of provisioned access control complements the vertical tailoring effected through the selection of UCOs. The features of the vertical are associated with a privilege that may be granted as discussed above. From the hosting company perspective, all of the options and associated privileges can be made available on one system (e.g., using the same hardware), and can be differentially billed through provisioned access control. The customer company selects options tailored to the needs of the customer company as determined by a CSR or a CCA. For each optional feature selected (e.g., purchased by the customer company), the CSR grants the associated privilege to the CCA as well as the ability to grant the privilege. The CCA then further tailors the vertical for individual CCEs by granting the privileges associated with vertical features to CCEs based on their individual needs and responsibilities.

General Matters

Embodiments of the invention provide methods and apparatuses for providing a highly tailored vertical. In accordance with various embodiment of the invention entities and processes from any number of verticals may be added to the set of UCOs thus providing a deep tailored vertical combining functionality from each vertical CRM as desired. The tailored verticals are not limited and can behave as deeply as required.

Since tailoring has been separated from the business logic core, conflicts between additional and existing entities and processes are reduced.

In accordance with one embodiment of the invention highly tailored verticals are provided by a hosting company within the context of a viable business model that is differentially billable and cost efficient. Additional framework is not based upon the number of customer companies, but on the number of users and amount of usage. Moreover, the hosted highly tailored verticals maintain a low footprint in that additional machines are not required because operations are dynamically hosted at runtime using an integrated runtime framework.

Provisioned access control allows each customer to be assessed costs based upon the extent of services provided and usage amount. For alternative embodiments of the invention, provisioned access control is implemented exclusive of UCOs for tailoring verticals.

Although described in terms of particular options and industries, it will be apparent that embodiments of the invention have applicability to a wide range of verticals and options regarding their associated entities and processes.

For example, embodiments of the invention provide the ability to create highly tailored verticals for such industries as aerospace, automotive, communications, finance, insurance, manufacturing, retail, energy, healthcare, transportation, hotel, among others.

Further, embodiments of the invention may be implemented using a variety of software. For example, the serialization of the subset entity and the superset entity are described above in reference to FIG. 2, as database records. For alternative embodiments of the invention in which an object oriented programming (OOP) language is employed, the referring serialization may be implemented as an OOP language object and a pointer that references another OOP language object implementing the serialization of the subset entity.

Figure 8:
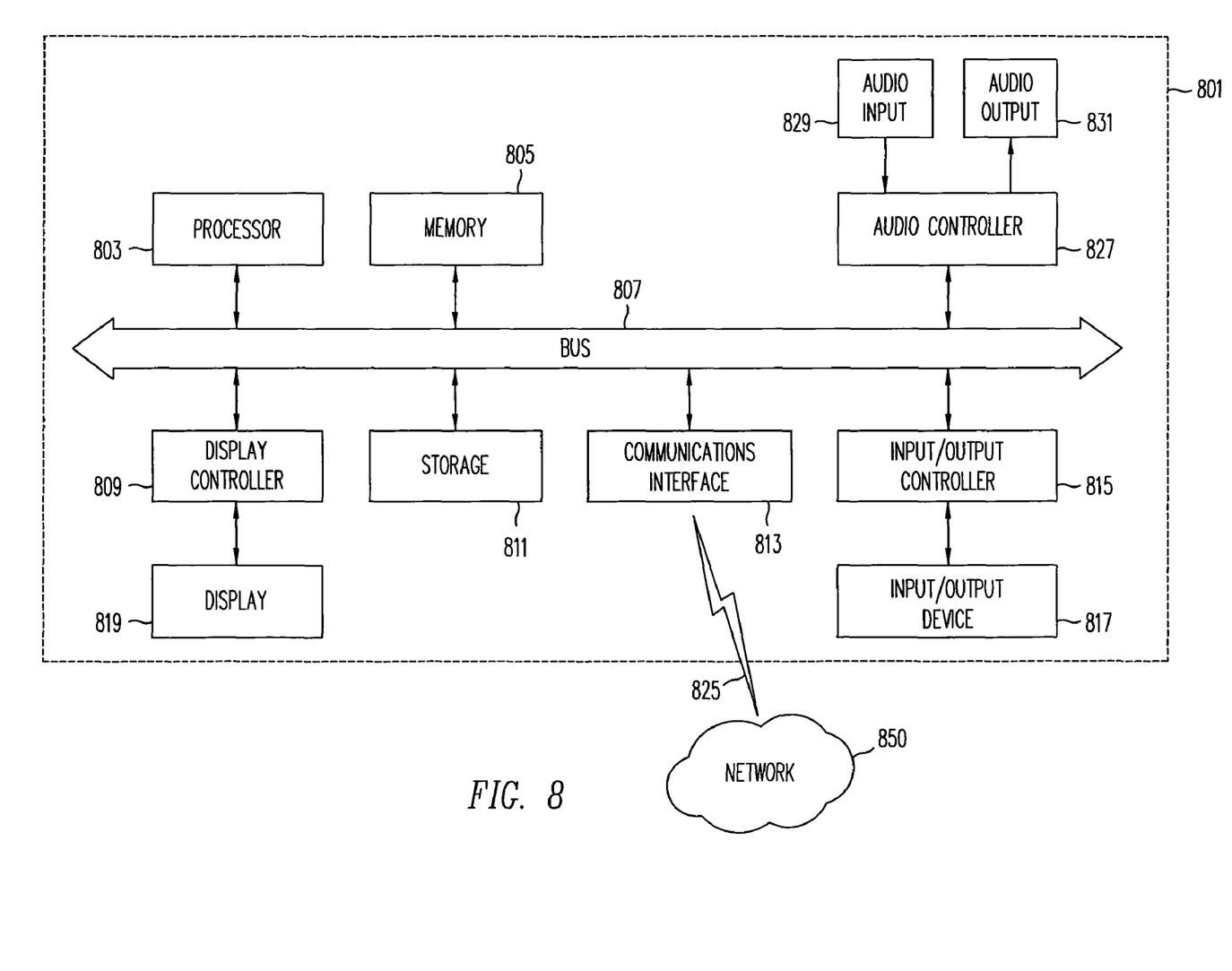
FIG. 8 is a block diagram illustrating one embodiment of a digital processing system that may be included within the customer company in accordance with an embodiment of the present invention.

As described above in reference to FIG. 1, the customer company may have one or more DPSs. FIG. 8 is a block diagram illustrating one embodiment of a DPS 801 that may be included within the customer company in accordance with an embodiment of the present invention. For alternative embodiments of the present invention, DPS 801 may be a computer that includes a processor 803 coupled to a bus 807. In one embodiment, memory 805, storage 811, display controller 809, communications interface 813, input/output controller 815 and audio controller 827 are also coupled to bus 807.

DPS 801 interfaces to external systems through communications interface 813. Communications interface 813 may include a radio transceiver compatible with wireless telephone signals or other interfaces for coupling a device to other devices. In one embodiment of the present invention, carrier wave signal 825 is received/transmitted between communications interface 813 and network 850. In one embodiment of the present invention, a communications signal 825 may be used to interface DPS 801 with another computer system, a network hub, router or the like. In one embodiment of the present invention, carrier wave signal 825 is considered to be machine readable media, which may be transmitted through wires, cables, optical fibers or through the atmosphere, or the like.

In one embodiment of the present invention, processor 803 may be a conventional microprocessor, such as for example but not limited to an Intel x86 or Pentium family microprocessor, a Motorola family microprocessor, or the like. Memory 805 may be a machine-readable medium such as dynamic random access memory (DRAM) and may include static random access memory (SRAM). Display controller 809 controls in a conventional manner a display 819, which in one embodiment of the invention may be a cathode ray tube (CRT), a liquid crystal display (LCD), an active matrix display, a television monitor or the like. The input/output device 817 coupled to input/output controller 815 may be a keyboard, disk drive, printer, scanner and other input and output devices (e.g., a mouse). In one embodiment of the present invention, audio controller 827 controls in a conventional manner audio output 831 and audio input 829.

Storage 811 may include machine-readable media such as for example but not limited to a magnetic hard disk, a floppy disk, an optical disk, a smart card or another form of storage for data. In one embodiment of the present invention, storage 811 may include removable media, read-only media, readable/writable media or the like. Some of the data may be written by a direct memory access process into memory 805 during execution of software in computer system 801. It is appreciated that software may reside in storage 811, memory 805 or may be transmitted or received via modem or communications interface 813. For the purposes of the specification, the term "machine readable medium" shall be taken to include any medium that is capable of storing data, information or encoding a sequence of instructions for execution by processor 803 to cause processor 803 to perform the methodologies of the present invention. The term "machine readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   providing a set of business entities and a set of business processes that operate on the business entities from a customer relationship management (CRM) application;
   creating a set of universal configuration options (UCOs), wherein
      the creating comprises at least one of
         decomposing a business entity of the set of business entities, wherein
            the decomposing the business entity yields at least two universal business entities, and
         decomposing a business process of the set of business processes, and
         each of the set of business entities and business processes existed prior to the creating;
   presenting the set of UCOs;
   receiving a selection, wherein
      the selection identifies one or more selected UCOs of the set of UCOs; and
   automatically configuring a tailored CRM application, wherein
      the automatically configuring facilitates management of aspects of a customer relationship by a company associated with the tailored CRM application, and
      the automatically configuring comprises
         utilizing the one or more selected UCOs,
         creating the tailored CRM application by modifying a base CRM application according to the one or more selected UCOs, granting a privilege of a plurality of grantable privileges, based on the selected UCOs, and establishing a differential cost assessment scheme, wherein the customer is assessed costs based on which of the plurality of grantable privileges is granted.

2. The method of claim 1 wherein the tailored CRM application is hosted.

3. The method of claim 1 wherein decomposing the business entity of the set of business entities and the business process of the set of business processes includes resolving entity conflicts between two or more entities, each entity associated with a respective existing CRM application.

4. The method of claim 3 wherein resolving an entity conflict includes resolving an overlapping entity conflict by a method comprising:

identifying a first entity having a first set of attributes and a second entity having a second set of attributes, a portion of the second set of attributes common to the first set of attributes and a portion of the second set of attributes non-common to the first set of attributes;

developing a serialization of the first entity;

developing a serialization of the portion of the second set of attributes non-common to the first set of attributes; and modifying processes affecting the first entity such that the first entity is capable of being managed as a sub-process of managing the second entity.

5. The method of claim 3 wherein resolving an entity conflict includes resolving an absolute entity conflict by a method comprising:

identifying a first entity having a first set of attributes and a second entity having a second set of attributes, at least one attribute of the first set of attributes conflicting with a corresponding attribute of the second set of attributes;

develop a serialization of the at least one attribute of the first set of attributes that conflicts with a corresponding attribute of the second set of attributes; and develop a serialization of the at least one attribute of the second set of attributes that conflicts with a corresponding attribute of the first set of attributes.

6. The method of claim 1 wherein decomposing the business entity of the set of business entities and the business process of the set of business processes includes resolving process conflicts between two or more processes, each process associated with a respective existing CRM application.

7. The method of claim 6 wherein resolving a process conflict includes:

analyzing a conflict between two processes;

determining the conflict is additive; and chaining the two processes.

8. The method of claim 6 wherein resolving a process conflict includes:

analyzing a conflict between two processes;

determining that the conflict is absolute;

identifying attributes and sub-processes from each of the two processes that pertain to the conflict;

defining a set of options for resolving the conflict; and presenting the set of options.

9. A machine-readable storage medium containing executable instructions which when executed by a digital process system cause the system to perform a method comprising:

providing a set of business entities and a set of business processes that operate on the business entities from a customer relationship management (CRM) application;

creating a set of universal configuration options (UCOs), wherein the creating comprises at least one of decomposing a business entity of the set of business entities, wherein the decomposing the business entity yields at least two universal business entities, and decomposing a business process of the set of business processes, and each of the set of business entities and business processes existed prior to the creating;

presenting the set of UCOs;

receiving a selection, wherein the selection identifies one or more selected UCOs of the set of UCOs; and automatically configuring a tailored CRM application, wherein the automatically configuring facilitates management of aspects of a customer relationship by a company associated with the tailored CRM application, and the automatically configuring comprises utilizing utilizes the one or more selected UCOs, creating the tailored CRM application by modifying a base CRM application according to the one or more selected UCOs, granting a privilege of a plurality of grantable privileges, based on the selected UCOs, and establishing a differential cost assessment scheme, wherein the customer is assessed costs based on which of the plurality of grantable privileges is granted.

10. The machine-readable storage medium of claim 9 wherein the tailored CRM application is hosted.

11. The machine-readable storage medium of claim 9 wherein instructions for decomposing the business entity of the set of business entities and the business process of the set of business processes include instructions for resolving entity conflicts between two or more entities, each entity associated with a respective existing CRM application.

12. The machine-readable storage medium of claim 11 wherein instructions for resolving an entity conflict include instructions for resolving an overlapping entity conflict by a method comprising:

identifying a first entity having a first set of attributes and a second entity having a second set of attributes, a portion of the second set of attributes common to the first set of attributes and a portion of the second set of attributes non-common to the first set of attributes;

developing a serialization of the first entity;

developing a serialization of the portion of the second set of attributes non-common to the first set of attributes; and modifying processes affecting the first entity such that the first entity is capable of being managed as a sub-process of managing the second entity.

13. The machine-readable storage medium of claim 11 wherein instructions for resolving an entity conflict include instructions for resolving an absolute entity conflict by a method comprising:

identifying a first entity having a first set of attributes and a second entity having a second set of attributes, at least one attribute of the first set of attributes conflicting with a corresponding attribute of the second set of attributes;

developing a serialization of the at least one attribute of the first set of attributes that conflicts with a corresponding attribute of the second set of attributes; and developing a serialization of the at least one attribute of the second set of attributes that conflicts with a corresponding attribute of the first set of attributes.

14. The machine-readable storage medium of claim 9 wherein instructions for decomposing the business entity of the set of business entities and business process of the set of business processes include instructions for resolving process conflicts between two or more processes, each process associated with a respective existing CRM application.

15. The machine-readable storage medium of claim 14 wherein instructions for resolving a process conflict include instructions for performing a method comprising:
  analyzing a conflict between two processes;
  determining the conflict is additive; and
  chaining the two processes.

16. The machine-readable storage medium of claim 14 wherein instructions for resolving a process conflict include instructions for performing a method comprising:
  analyzing a conflict between two processes;
  determining that the conflict is absolute;
  identifying attributes and sub-processes from each of the two processes that pertain to the conflict;
  defining a set of options for resolving the conflict; and
  presenting the set of options.

17. A customer relationship management (CRM) application hosting system comprising:
  a data store configured to
    provide a set of business entities and a set of business processes configured to operate on the business entities from a customer relationship management (CRM) application;
    store a set of universal configuration options (UCOs), wherein
      the storing comprises at least one of decomposing a business entity of the set of business entities, wherein
        the decomposing the business entity yields at least two universal business entities, and
      decomposing a business process of the set of business processes, and
      each of the set of business entities and business processes existed prior to the storing;
  a communication system coupled to a processing system to present the set of UCOs and receive a selection, wherein
    the selection identifies one or more selected UCOs of the set of UCOs;
  a communications interface configured to couple the communication system to a network; and
  the processing system configured to automatically configure a tailored CRM application, wherein
    the automatically configuring facilitates management of aspects of a customer relationship by a company associated with the tailored CRM application, and
    the automatically configuring comprises utilizing the one or more selected UCOs,
      creating the tailored CRM application by modifying a base CRM application according to the one or more selected UCOs,
      granting a privilege of a plurality of grantable privileges, based on the selected UCOs, and
      establishing a differential cost assessment scheme, wherein
        the customer is assessed costs based on which of the plurality of grantable privileges is granted.

18. The CRM application hosting system of claim 17 wherein the communication system is selected from the group consisting of an Internet, a wide area network, a local area network, an intranet, and combinations thereof.

19. The CRM application hosting system of claim 17 wherein decomposing the business entity of the set of business entities and business process of the set of business processes includes resolving entity conflicts between two or more entities, each entity associated with a respective existing CRM application.

20. The CRM application hosting system of claim 19 wherein resolving an entity conflict includes resolving an overlapping entity conflict by a method comprising:
  identifying a first entity having a first set of attributes and a second entity having a second set of attributes, a portion of the second set of attributes common to the first set of attributes and a portion of the second set of attributes non-common to the first set of attributes;
  developing a serialization of the first entity;
  developing a serialization of the portion of the second set of attributes non-common to the first set of attributes; and
  modifying processes affecting the first entity such that the first entity is capable of being managed as a sub-process of managing the second entity.

21. The CRM application hosting system of claim 19 wherein resolving an entity conflict includes resolving an absolute entity conflict by a method comprising:
  identifying a first entity having a first set of attributes and a second entity having a second set of attributes, at least one attribute of the first set of attributes conflicting with a corresponding attribute of the second set of attributes;
  developing a serialization of the at least one attribute of the first set of attributes that conflicts with a corresponding attribute of the second set of attributes; and
  developing a serialization of the at least one attribute of the second set of attributes that conflicts with a corresponding attribute of the first set of attributes.

22. The CRM application hosting system of claim 17 wherein decomposing the business entity of the set of business entities and business process of the set of business processes includes resolving process conflicts between two or more processes, each process associated with a respective existing CRM application.

23. The CRM application hosting system of claim 22 wherein resolving a process conflict includes performing a method comprising:
  analyzing a conflict between two processes;
  determining the conflict is additive; and
  chaining the two processes.

24. The CRM application hosting system of claim 22 wherein resolving a process conflict includes performing a method comprising:
  analyzing a conflict between two processes;
  determining that the conflict is absolute;
  identifying attributes and sub-processes from each of the two processes that pertain to the conflict;
  defining a set of options for resolving the conflict; and
  presenting the set of options.

* * * * *

UNITED STATES PATENT AND TRADEMARK OFFICE
CERTIFICATE OF CORRECTION

| | | |
|---|---|---|
| PATENT NO. | : 7,958,161 B2 | Page 1 of 1 |
| APPLICATION NO. | : 11/001358 | |
| DATED | : June 7, 2011 | |
| INVENTOR(S) | : Bezeau et al. | |

It is certified that error appears in the above-identified patent and that said Letters Patent is hereby corrected as shown below:

Title page 2, in column 2, under "Other Publications", line 1, delete "www.wikipedia.ort.," and insert -- www.wikipedia.org., --, therefor.

In column 14, line 23-24, in Claim 9, after "utilizing" delete "utilizes".

Signed and Sealed this
Twenty-fifth Day of October, 2011

David J. Kappos
*Director of the United States Patent and Trademark Office*